United States Patent
Takashima et al.

(10) Patent No.: US 6,870,298 B2
(45) Date of Patent: Mar. 22, 2005

(54) ROTATING ELECTRIC MACHINE

(75) Inventors: Kazuhisa Takashima, Tokyo (JP); Akihiro Shibata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/791,526

(22) Filed: Mar. 3, 2004

(65) Prior Publication Data

US 2004/0189120 A1 Sep. 30, 2004

(30) Foreign Application Priority Data

Mar. 27, 2003 (JP) ..................................... P.2003-087274

(51) Int. Cl.$^7$ .............................................. H02K 13/00
(52) U.S. Cl. ........................................ 310/239; 310/71
(58) Field of Search ................................ 310/239, 242, 310/248, 89, 71

(56) References Cited

U.S. PATENT DOCUMENTS

| | | | | |
|---|---|---|---|---|
| 3,745,393 A | * | 7/1973 | Spors .......................... | 310/239 |
| 3,924,147 A | * | 12/1975 | Tarnow et al. ............. | 310/68 R |
| 4,501,983 A | * | 2/1985 | Schmider ................... | 310/113 |
| 5,089,735 A | * | 2/1992 | Sawaguchi et al. ........... | 310/88 |
| 5,280,207 A | * | 1/1994 | Nishmura ................... | 310/67 R |
| 5,610,456 A | * | 3/1997 | Wille et al. ................ | 310/58 |
| 5,942,822 A | * | 8/1999 | Iwata et al. ................. | 310/71 |
| 6,329,735 B1 | * | 12/2001 | Tanaka et al. .............. | 310/239 |
| 6,734,589 B2 | * | 5/2004 | Kogure et al. .............. | 310/89 |

FOREIGN PATENT DOCUMENTS

| | | |
|---|---|---|
| JP | 2000-197314 | 7/2000 |
| JP | 2002-078294 | 3/2002 |
| JP | 2002-320353 | 10/2002 |

* cited by examiner

Primary Examiner—Darren Schuberg
Assistant Examiner—Nguyen Hanh
(74) Attorney, Agent, or Firm—Sughrue Mion, PLLC (57) ABSTRACT

A rotating electric machine, including: a bowl-like housing having a through hole penetrated by a shaft and having a cutout portion in a part of an opening portion; a commutator fixed to the shaft; a base fixed to the housing by a clamp screw and having a tapped hole through which the clamp screw is inserted with a play; a brush disposed in the base and rubbing against the commutator; a plate having a joint portion to which a lead wire led outside is welded and fixed to the base; a grommet penetrated by the lead wire and engaged in the cutout portion of the housing; and a positioning unit which positions the lead wire to be welded in the joint portion.

9 Claims, 12 Drawing Sheets

ROTATING ELECTRIC MACHINE

BACKGROUND OF THE INVENTION

1. Field of the Invention

The present invention relates to a rotating electric machine with a brush, and more particularly to a rotating electric machine that is suitably employed for a brush motor for an electric power steering apparatus.

2. Background Art

A conventional commutator motor was composed of a housing having a through hole penetrated by a shaft and having a concave shape, an armature fixed to the shaft, a commutator fixed to an end portion of the shaft, a brush device comprising a base fixed to the housing by a clamp screw and having a tapped hole through which the clamp screw is inserted with a play, and a brush in contact with the commutator, and positioning means for positioning the brush to the commutator, the positioning means being provided between an outer circumferential face of the base and an inner wall face of the housing. Another conventional commutator motor was composed of a housing having a through hole penetrated by a shaft and having a concave shape, an armature fixed to the shaft, a commutator fixed to an end portion of the shaft, a brush device comprising a base fixed to the housing by a clamp screw and having a tapped hole through which the clamp screw is inserted with a play, with a plate contained by insert molding, and a brush in contact with the commutator, a grommet resiliently engaged in a cutout portion of the base, and the lead wires penetrating through the grommet and coupled with the plate electrically connected to the brush (e.g., refer to JP-A-2000-197314 (paragraphs [0004], [0008], FIG. 1, FIG. 9)).

Though in the conventional commutator motor, the positioning means was provided between the outer circumferential face of the base and the inner wall face of the housing to position the brush to the commutator, there was by necessity a small clearance for assembling between the outer circumferential face of the base and the inner wall face of the housing to accommodate the base in the inner wall face of the housing. Therefore, if the welding position of the lead wire to the joint portion was shifted, there was a problem that when the base and the grommet were inserted and assembled into the housing, the base or grommet was not smoothly assembled, the base was biased in a range of the small clearance to prevent smooth tightening of the clamp screw, or the brush sound was increased. Of course, in the apparatus without positioning means, the degree of the problem was significant. Also, in the apparatus having flexibility at the top end portion of the lead wire, it was required to change the lead wire to one having flexibility at the top end portion, resulting in a problem that the number of parts or working processes was increased, and the cost was increased.

Also, especially in the brush motor for electric power steering apparatus, since the armature is rotated in both directions, it is further required not only to reduce the brush sound, but also to make the brush sound low and uniform in both rotational directions to improve the silence within the vehicle, because if the magnitude of brush sound is varied depending on the rotational direction, the sound is very offensive to the ear.

SUMMARY OF THE INVENTION

This invention has been achieved to solve the above-mentioned problems, and it is an object of the invention to provide a rotating electric machine in which the assembling is excellent, the brush sound is reduced, and the cost is low. Particularly, it is another object of the invention to provide a rotating electric machine that is suitably employed for a brush motor for an electric power steering apparatus.

To achieve the object, the invention provides a rotating electric machine, including: a bowl-like housing having a through hole penetrated by a shaft and having a cutout portion in a part of an opening portion; a commutator fixed to the shaft; a base fixed to the housing by a clamp screw and having a tapped hole through which the clamp screw is inserted with a play; a brush disposed in the base and rubbing against the commutator; a plate having a joint portion to which a lead wire led outside is welded and fixed to the base; a grommet penetrated by the lead wire and engaged in the cutout portion of the housing; and a positioning unit which positions the lead wire to be welded in the joint portion.

BRIEF DESCRIPTION OF THE DRAWINGS

The present invention may be more readily described with reference to the accompanying drawings.

DETAILED DESCRIPTION OF THE PREFERRED EMBODIMENTS

Embodiment 1

Figure 1:
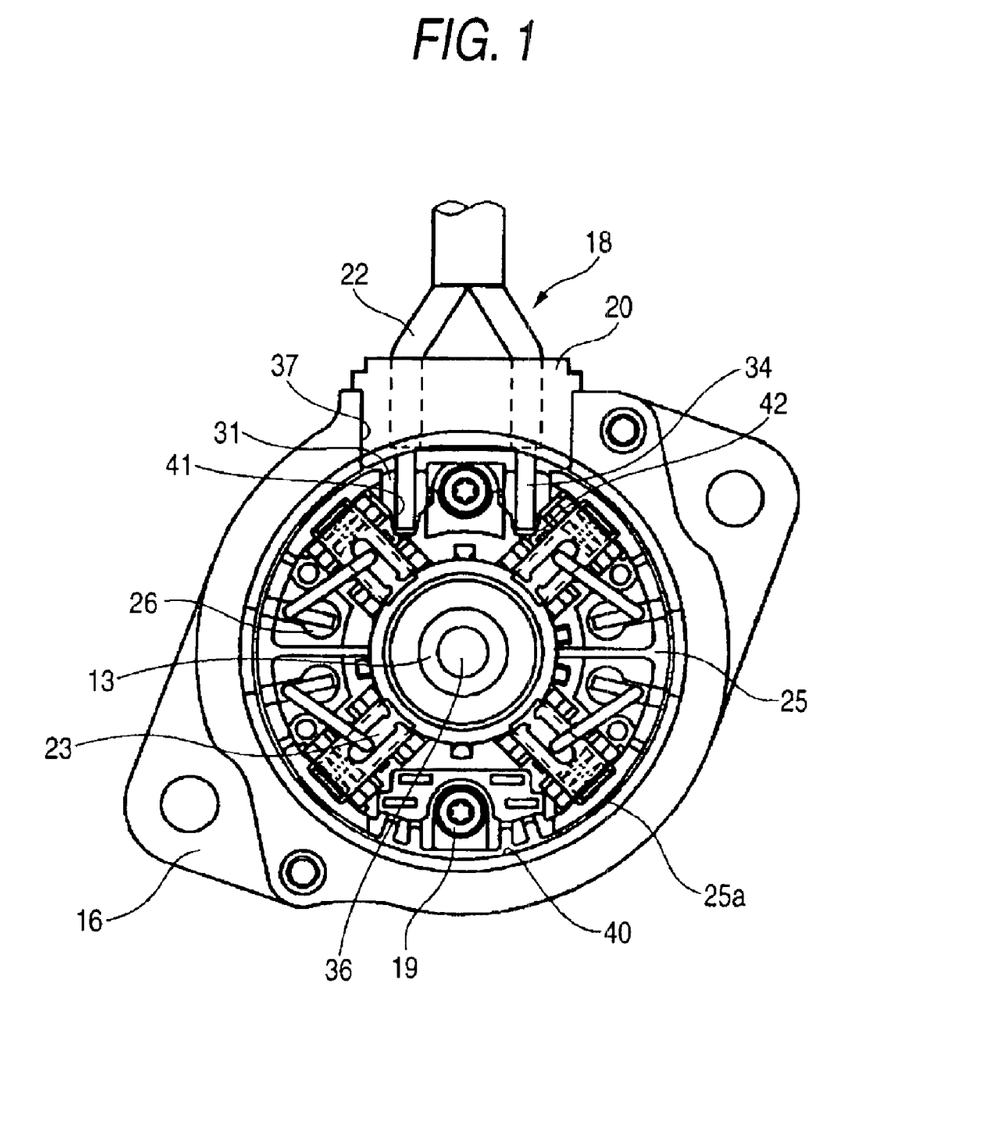
FIG. 1 is a front view of a rotating electric machine housing and a brush holder device according to an embodiment 1 of the present invention.
Figure 2:
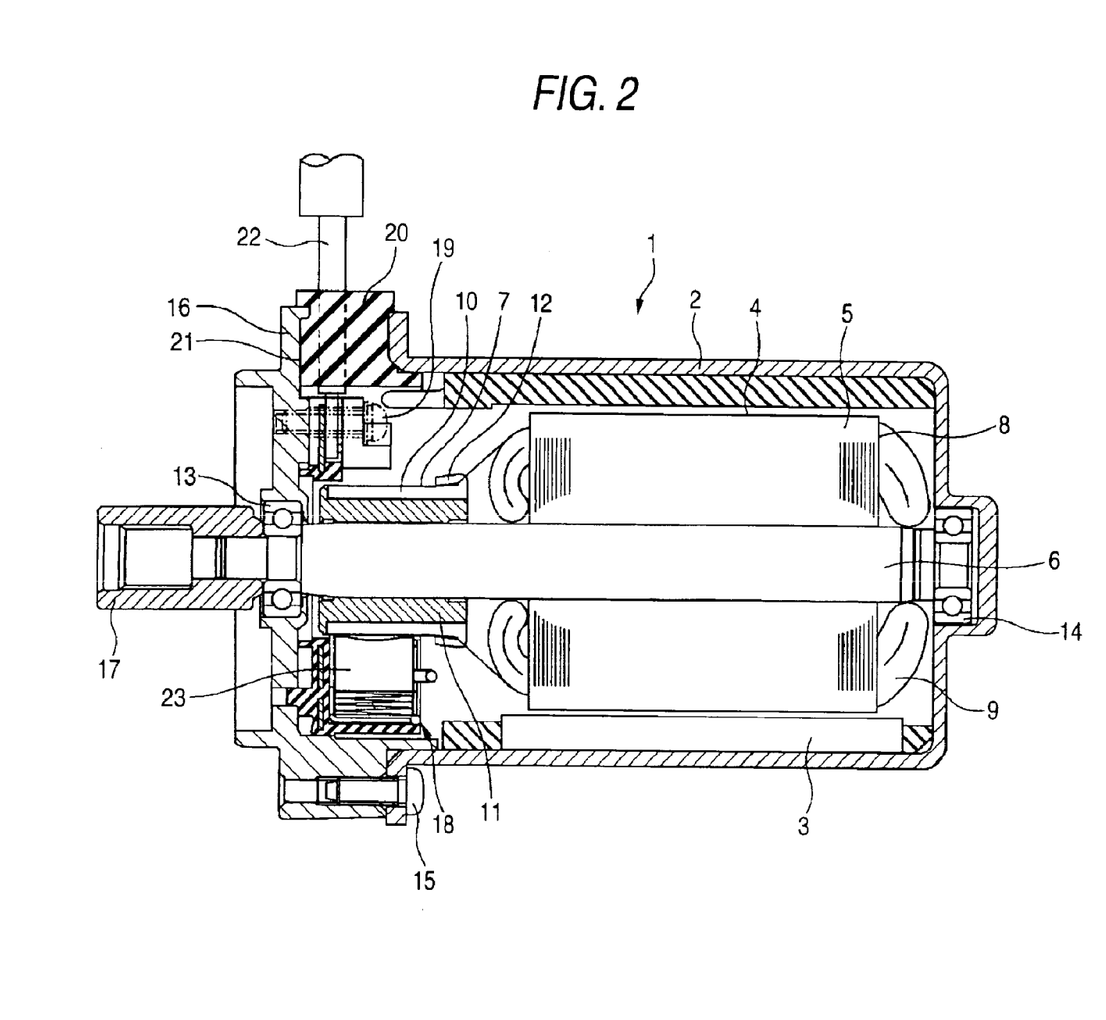
FIG. 2 is an axial cross-sectional view of a rotating electric machine according to the embodiment 1 of the invention.
Figure 3:
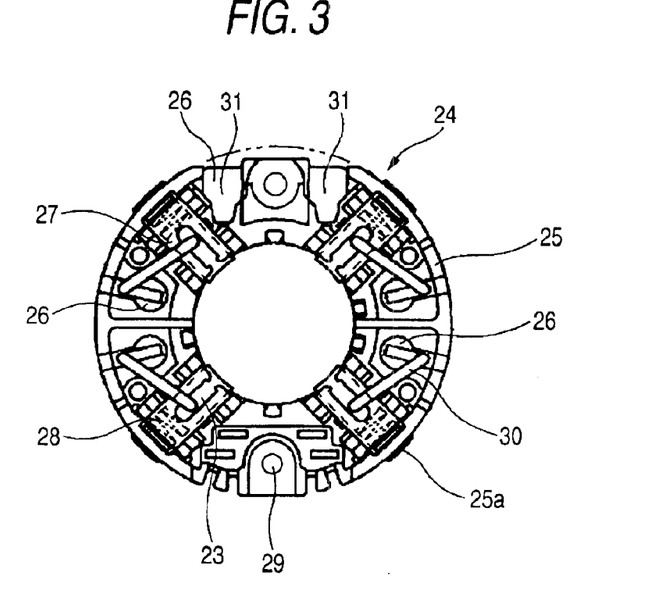
FIG. 3 is a front view of a brush holder according to the embodiment 1 of the invention.
Figure 4:
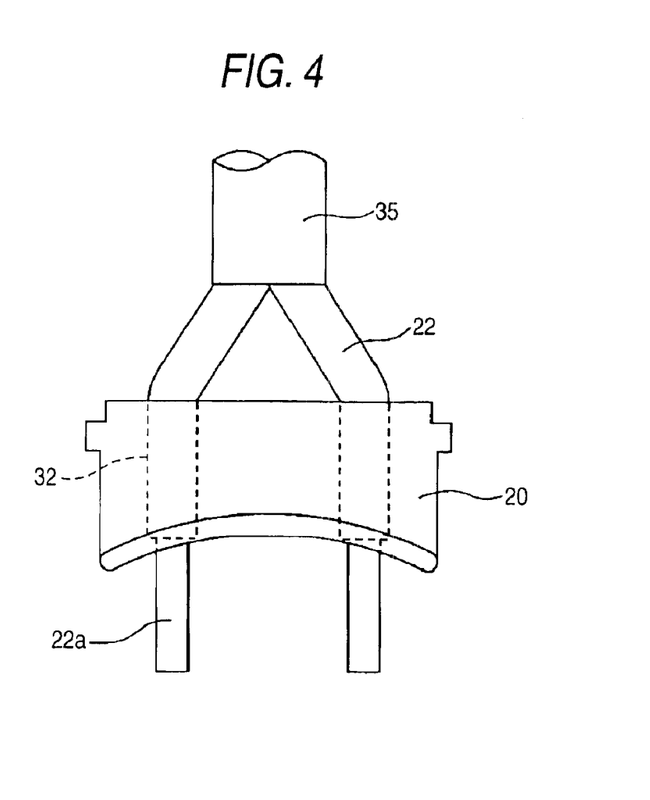
FIG. 4 is a front view near a grommet according to the embodiment 1 of the invention.
Figure 5A:
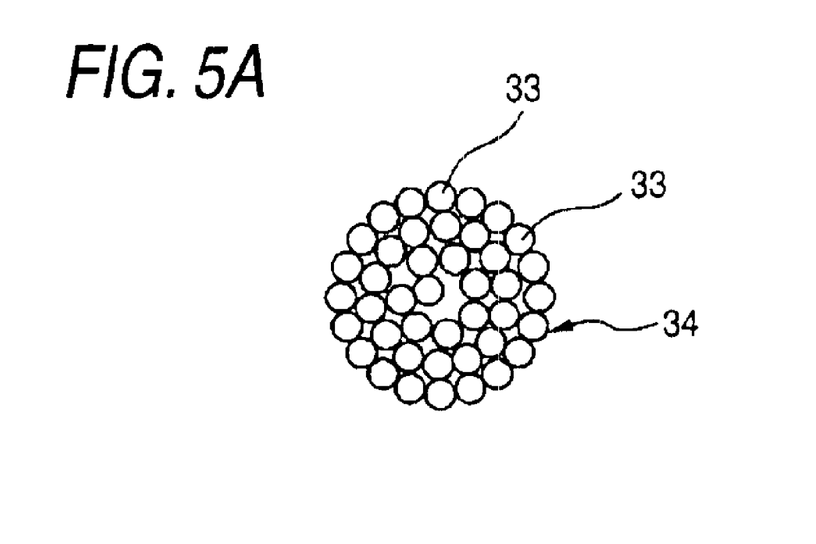
FIGS. 5A–5C are explanatory views showing how to weld a top end portion of the lead wire according to the embodiment 1 of the invention.
Figure 5B:
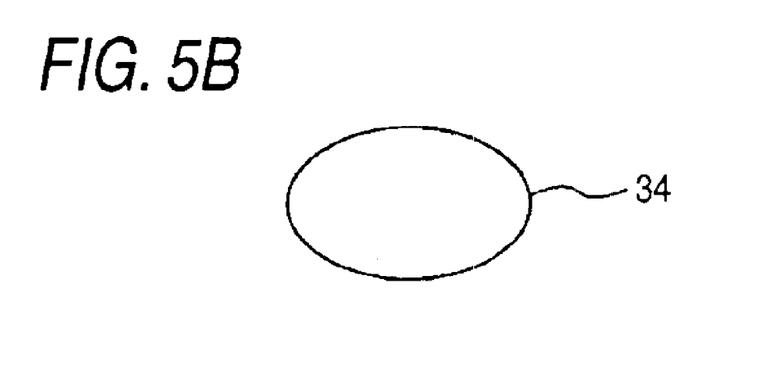
Figure 5C:
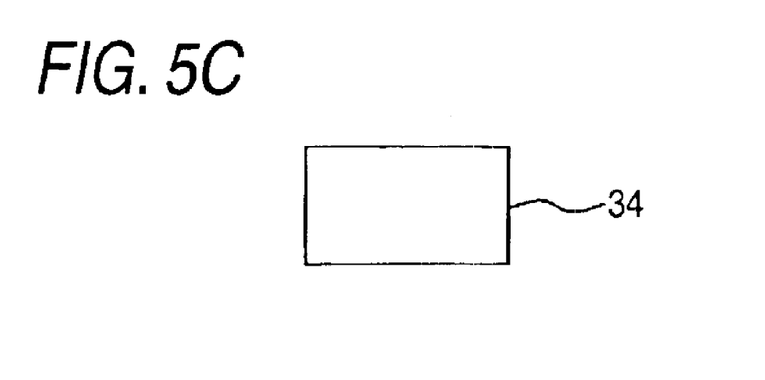
Figure 6:
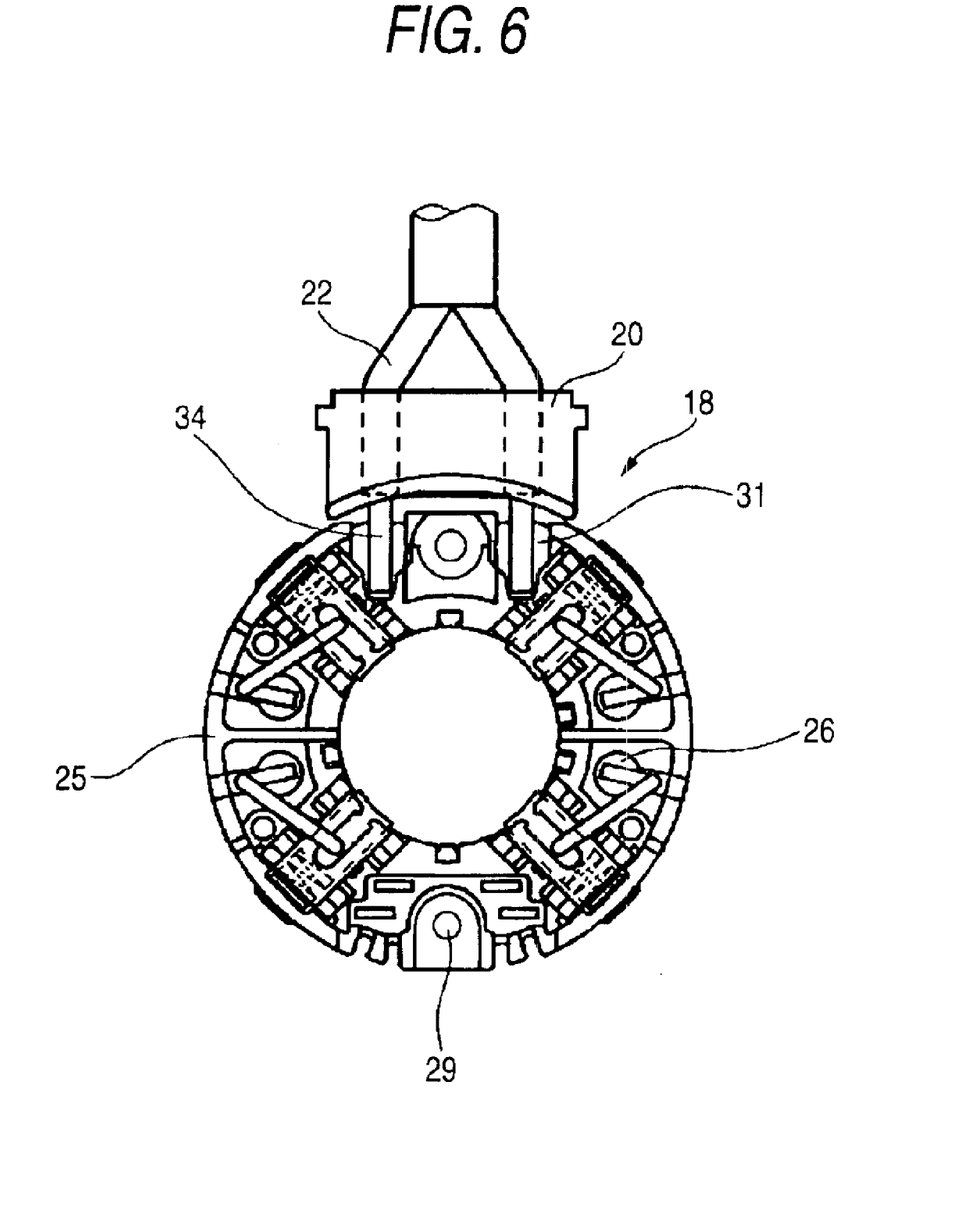
FIG. 6 is a front view of the brush holder device according to the embodiment 1 of the invention.
Figure 7:
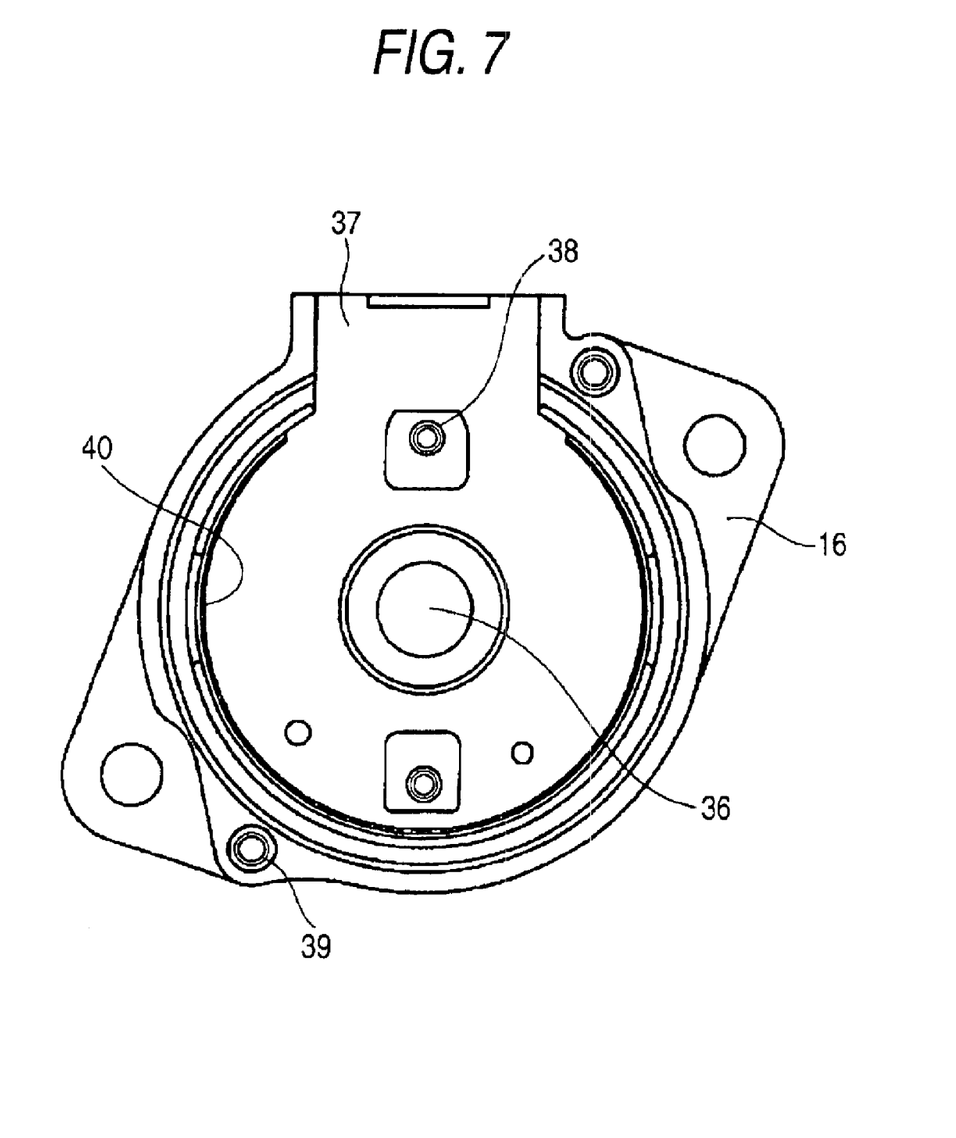
FIG. 7 is a front view of the housing according to the embodiment 1 of the invention.
Figure 8:
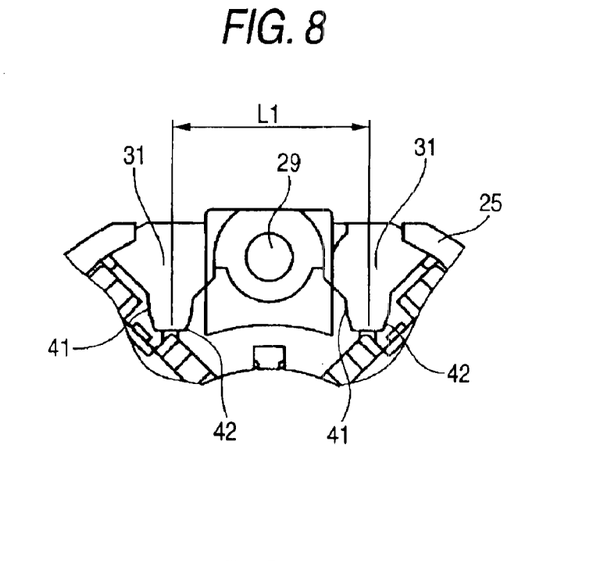
FIG. 8 is a detailed view near a joint portion of the brush holder according to the embodiment 1 of the invention.
Figure 9:
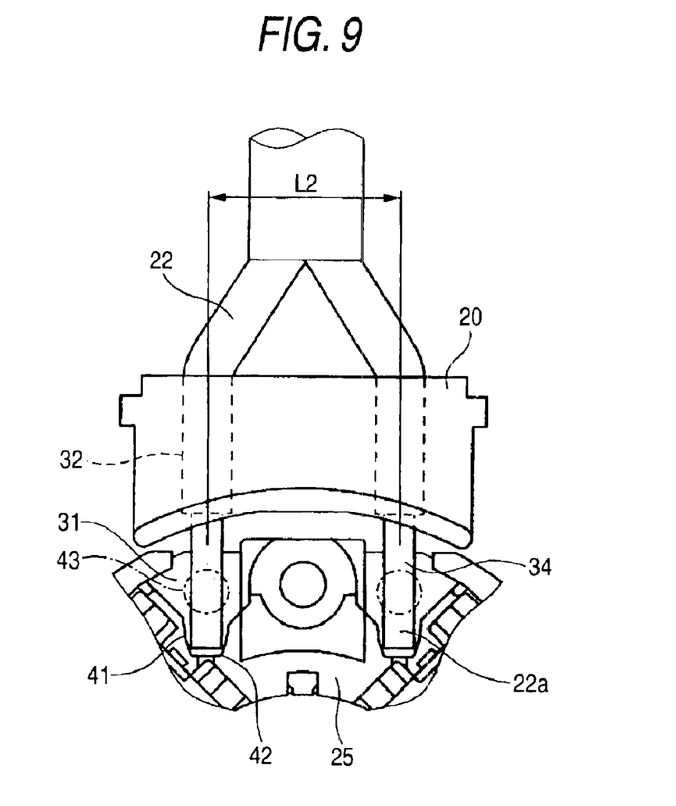
FIG. 9 is a detailed view near a lead wire lead-out portion according to the embodiment 1 of the invention.
Figure 10:
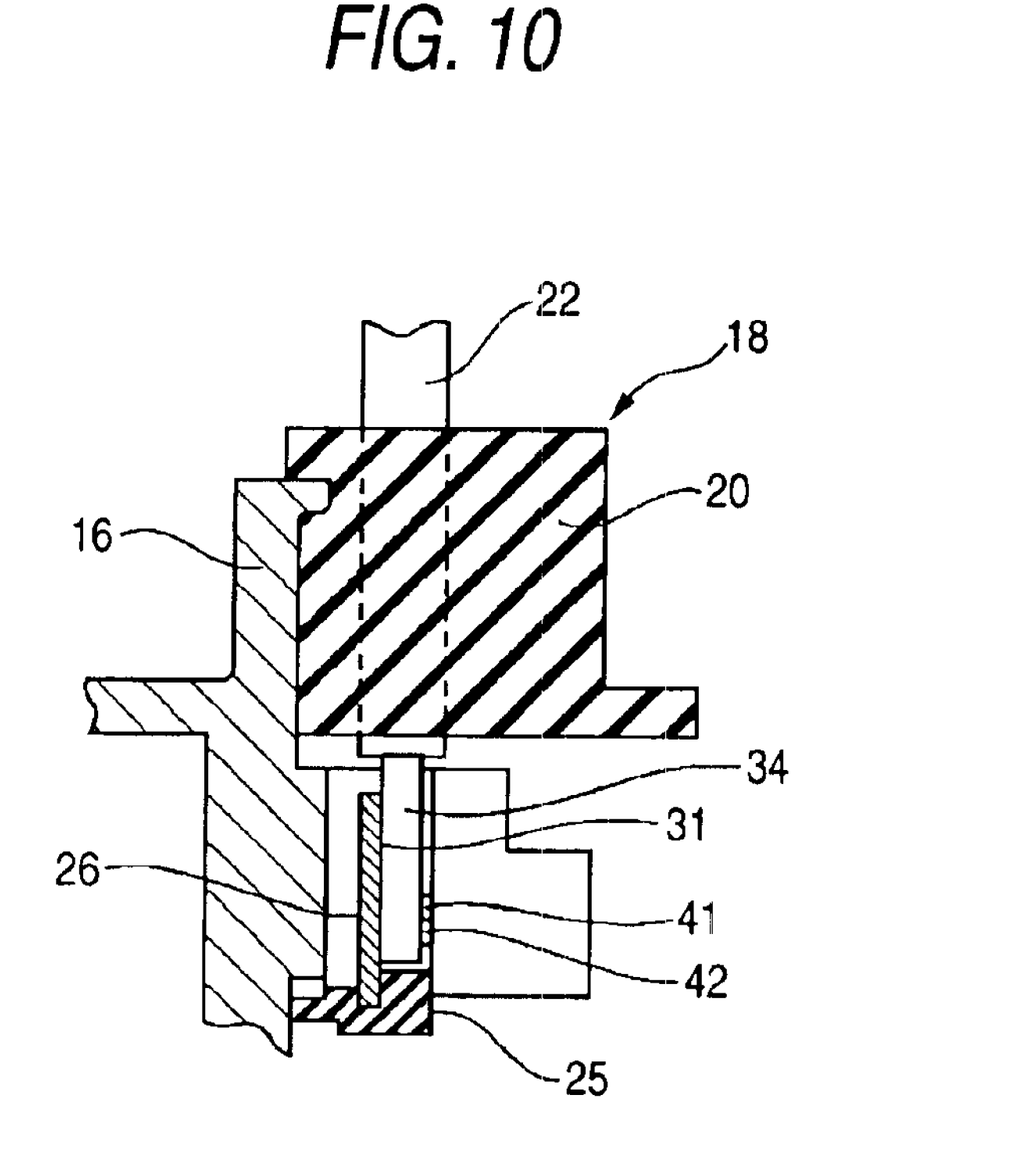
FIG. 10 is a cross-sectional view of the essence near the lead wire lead-out portion according to the embodiment 1 of the invention.

Referring to FIGS. 1 to 10, a rotating electric machine according to an embodiment 1 of the present invention will be described below. FIG. 1 is a front view of a rotating electric machine housing and near a brush holder device. FIG. 2 is an axial cross-sectional view of a rotating electric machine. FIG. 3 is a front view of a brush holder. FIG. 4 is a front view near a grommet. FIG. 5 is an explanatory view showing how to weld a top end portion of the lead wire. FIG. 6 is a front view of the brush holder device in which the grommet of FIG. 4 is assembled in the brush holder of FIG. 3. FIG. 7 is a front view of the housing, in which FIG. 1 shows a situation where the brush holder of FIG. 6 is assembled into the housing of FIG. 7. FIG. 8 is a detailed view near a joint portion of the brush holder. FIG. 9 is a detailed view near a lead wire lead-out portion, in which the grommet of FIG. 4 is assembled in the joint portion of FIG. 8. FIG. 10 is a cross-sectional view of the essence near the lead wire lead-out portion as shown in FIG. 2. In the figures, the same or like parts are designated by the same numerals.

In FIG. 2, a brush motor 1 for electric power steering apparatus serving as a rotating electric machine has fixed a magnet 3 making up a field portion of four poles on an inner wall face of a yoke 2, with a core 5 of an armature 4 being opposed with a certain gap to the inner diameter side of the magnet 3. The armature 4 comprises the core 5 fixed to a shaft 6 and a commutator 7, in which the core 5 having the electromagnetic steel plates laminated has a slot 8, and the slot 8 has a winding 9 composed of enameled copper wires wound multiple times. The commutator 7 has a commutator bar 10 that is integrally molded of resin 11 such as phenol, fixed and insulated, and press fit into the shaft 6. A hook 12 is formed integrally with the commutator bar 10 at one end on the outer circumferential face of the commutator bar 10, and the winding 9 is engaged in the hook 12 and connected to the commutator bar 10 by fusing.

The armature 4 is rotably supported by the bearings 13 and 14, and the yoke 2 is fixed to a housing 16 by a fixing screw 15. Though one end of the shaft 6 penetrates through the housing 16, a coupling 17 is fixed at one end of the shaft 6 by press fit, and linked to a worm shaft, not shown, to transmit a rotational force of the armature 4. A brush holder device 18 is fixed by tightening the clamp screw 19 to the bowl-like housing 16. A grommet 20 is engaged with an interference in a cutout portion 21 provided in a part of an opening portion of the housing 16, and pressed axially by an end face of the yoke 2, a lead wire 22 being led out through the grommet 20. Also, a brush 23 provided in the brush holder device 18 rubs against the outer circumferential face of the commutator 7.

Referring to FIGS. 3 to 6, the brush holder device 18 will be described. First of all, FIG. 3 shows a brush holder 24. A plate 26 made from a brass plate and making an electric path is insert molded into a base 25 molded of resin such as PPS, and four brushes 23 and a spring 28 for pressing the brushes onto the outer circumferential face of the commutator 7 are disposed in a box portion formed in a holder 27 by assembling the holder 27 into the base 25. The base 25 has a tapped hole with play 29 through which the clamp screw 19 is inserted with a play, and four pigtails of the brushes 23 are spot welded in a region of the insert molded plate 26 that is exposed on the surface of the base 25. Also, the plate 26 has two joint portions 31, to which the lead wire 22 is welded, at the upper part in the figure, making up an electric path from the joint portion to the spot welded portion of the pigtail 30. The joint portion 31 is disposed inside the outer circumferential face of the roughly circular base 25, with four projections 25a molded integrally with the base 25 and projecting radially for positioning the base 25 being provided on the outer circumferential face of the base 25.

FIG. 4 shows a grommet in which the lead wire 22 formed of a heat resistant low voltage electric wire for vehicle is inserted into two insertion holes 32 provided in the grommet 20 composed of an elastic body such as rubber, the lead wire 22 is led out of the joint portion 31 by a certain length, and the coatings are removed from the top end portion 22a of the lead wire 22. An outer shape of the lead wire 22 has an interference with respect to the insertion hole 32. The other lead wire 22 (outside the motor) has a tube 35 inserted into the two positive and negative lead wires 22, in which a connector, not shown, is provided at the top end of the lead wire 22, and connected to a control device for the electric power steering apparatus, not shown.

FIG. 5A shows a conductor 34 composed of a number of element wires 33, with the coatings removed from the top end portion 22a of the lead wire 22. By spot welding the element wires 33 beforehand, the conductor 34 of almost elliptical shape is produced by integrating the element wires 33 not to be loosen, as shown in FIG. 5B. FIG. 5C shows another shape example of spot-welding, in which the element wires 33 are integrated in the almost rectangular shape by spot welding. By spot welding beforehand the element wires 33 integrally in the almost rectangular shape, the element wires 33 are not loosen, and the shape of the conductor 34 is determined. FIG. 6 shows the brush holder device 18 in which the conductor 34 at the top end portion 22a of the lead wire 22 as shown in FIG. 4 is spot welded at a predetermined position. A total of the cross-sectional area of the element wires 33 of the lead wire 22 is about 2 to 8 square millimeters.

FIG. 7 is a front view of the housing 16 on the side of the opening portion where the brush holder device 18 is mounted. The housing 16 has a through hole 36 penetrated by the shaft 6 and a cutout portion 37 in a part of the opening portion. The grommet 20 for radially leading out the lead wire 22 is engaged with an interference in the cutout portion 37, and the bowl-like housing 16 accommodates the brush holder device 18. Also, it comprises a threaded portion 38 into which the clamp screw 19 for fixing the base 25 is screwed and a threaded portion 39 into which the fixing screw 15 for fixing the yoke 2 is screwed. Moreover, it comprises a concave portion 40 formed coaxially with the shaft center, and a positioning unit for positioning the brush 23 to the commutator 17 with respect to the projection 25a provided in the base 25.

In FIG. 1, the bearing 13 is press fit into the housing 16 of FIG. 7, and the brush holder device 18 of FIG. 6 is assembled and fixed by the clamp screw 19. The base 25 is assembled in the bowl-like housing 16 while being guided by the projection 25a and the concave portion 40, and by pressing the grommet 20 into the cutout portion 37. Thereafter, the clamp screw 19 is tightened through the tapped hole 29 into the threaded portion 38 to fix the base 25 to the housing 16. Moreover, the armature 4 is assembled, and the coupling 17 is press fit, and the yoke 2 is fixed by the fixing screw 15, whereby the brush motor 1 for electric power steering apparatus is made up.

Referring to FIGS. 8 and 9, the positioning unit provided in the joint portion 31 will be described. The joint portion 31 has a guide portion 41 serving as a positioning unit made integrally of PPS resin to form the base 25. The guide portion 41 has a tapered face 42 and has a protuberant shape rising upwards from the surface of the joint portion 31. Also, the interval between two guide portions 41 is equal to L1. Also, the interval between two lead wires 22 for positive and negative polarities penetrating through the grommet 20 is equal to 12. The top end portion 22a of the conductor 34 for the lead wire 22 inserted into the grommet is placed in the guide portion 41 so that the welding position is decided, and the conductor 34 is led along the tapered face 42 into the welding position smoothly and correctly. The top end portion 22a of the conductor 34 for the lead wire 22 extends farther to the guide portion 41 than an electrode 43 at the time of spot welding. The electrode 43 is disposed on a back side of the joint portion 31 of FIG. 9 and on an upper side of the conductor 34, pressurized from both sides and energized, whereby the conductor 34 is spot welded to the joint portion 31. Also, the position at which the lead wire 22 penetrates through the joint portion 31 and the position of the joint portion 31 provided in the plate 26 are roughly the same in the axial direction, as shown in FIG. 10.

In the brush motor 1 for electric power steering apparatus as constituted above, the motor is energized through the lead wire 22 from the control device, not shown, so that the armature 4 is rotated owing to an electromagnetic force between the armature 4 and the magnet 3, and a rotational force of the armature 4 is transmitted to a worm shaft, not shown, engaging the coupling 17 provided at one end of the shaft 6 to assist the driver with a steering force.

As described above, since the joint portion 31 provided in the plate fixed to the base 25 comprises the guide portion 41 serving as the positioning unit for welding, the welding position of the lead wire 22 is decided to make stable the positional relation between the brush holder 24 of the brush holder device 18 and the grommet 20, whereby the rotating electric machine is produced cheaply in which the assembling of the brush holder device 18 into the housing 16 or the clamp screw 19 is excellent, the base 25 is less biased, and the brush sound is reduced and stable in the rotational direction.

Moreover, since the grommet 20 is not subjected to a biased force caused by shifted welded position of the lead wire 22, the water proofing of the grommet 20 is improved. Since the welding position of the lead wire 22 is positioned, the positional relation with the electrode 43 is stable, whereby the weldability is improved such as less sputter in welding or the greater welding strength. Therefore, the sputter removal work is not required or facilitated, whereby there is the effect that the rubbing ability of the brush 23 or the insulating ability of the brush holder device is enhanced. Also, since the lead wire 22 is welded to the brush holder device 18, the sputter is removed easily and securely in the brush holder device 18, which is assembled into the housing 16 after removal of the sputter.

Since the guide portion 41 serving as the positioning unit is integrally molded of resin material forming the base 25, the formation of the positioning unit is simple, whereby the small and cheap apparatus is obtained.

Since the guide portion 41 serving as the positioning unit has the tapered face 42 for leading the lead wire 22 to the welding position, the top end portion 22a of the lead wire 22 is smoothly positioned along the tapered face 42, so that the welding position of the lead wire 22 is easily determined, and thus the workability is improved with the stable size after welding.

Since the lead wire 22 has the conductor 34 composed of a number of element wires 33, the element wires 33 at the top end portion 22a welded to the joint portion 31 being fixed beforehand by welding, the shape of the conductor 34 is determined, so that the guide portion 41 serving as the positioning unit can stably position the lead wire with enhanced workability, and the weldability is improved such as less sputter produced in welding, and the high welding strength. Even if the lead wires 22 have the conductors 34 of different cross-sectional areas, the lead wires are positioned in the same way by changing the shape or size after fixing, whereby the parts such as the brush holder 24 are shared.

Since the interval between the lead wires 22 penetrating through the grommet 20 and the interval between the guide portions 41 serving as the positioning units for positioning the lead wire 22 to be welded are the same, there is no need for excessively bending the lead wire 22, so that no force is biased to the base. The workability of disposing the lead wire 22 at the welding position is excellent, the size after welding is stable, and the water proofing is improved. Particularly, there is the great effect for the thick lead wire 22 with the conductor 34 of large cross-sectional area, because the workability is worse and the size is less stable, if the intervals are different. Also, since the position at which the lead wire 22 penetrates through the joint portion 31 and the position of the joint portion 31 provided in the plate 26 are roughly the same in the axial direction, as shown in FIG. 10, there is further the great effect.

Since the plate 26 is insert molded of resin material forming the base 25, the fixation of the plate 26 is simple, the insulation is superior due to smaller exposed portion, and the sputter is reduced due to positioning for welding, the small and cheap apparatus is produced with excellent brush rubbing ability and insulation, even when the joint portion 31 is disposed inside the outer circumferential face of the base 25.

Since the rotating electric machine is the brush motor 1 for electric power steering apparatus, the steering feeling is more excellent by reducing a difference in the brush sound depending on the rotational direction, so that the rotation failure or lower insulation does not occur due to sticking of welding sputter, and there is high safety. Thereby, the rotating electric machine is suitable for the brush motor 1 for electric power steering apparatus. Also, in the brush motor 1 for electric power steering apparatus, the armature 4 may be rotated left or right from the steering via a speed reducer in a state where the motor is less energized, when the steering is operated minutely to the left or right near the neutral point. At this time, the sound generated from the brush-rubbing portion or the difference in the sound between left and right sides is reduced, whereby the rotating electric machine is suitable for the brush motor 1 for electric power steering apparatus.

Embodiment 2

Figure 11:
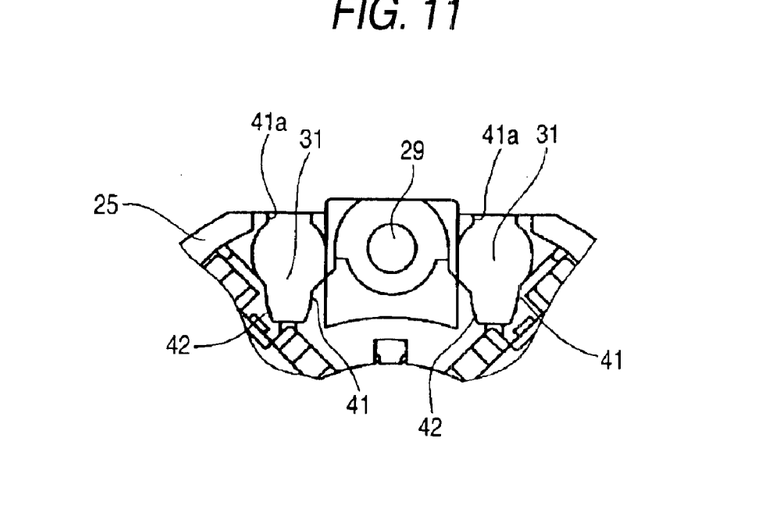
FIG. 11 is a detailed view near a joint portion of a brush holder according to an embodiment 2 of the invention.
Figure 12:
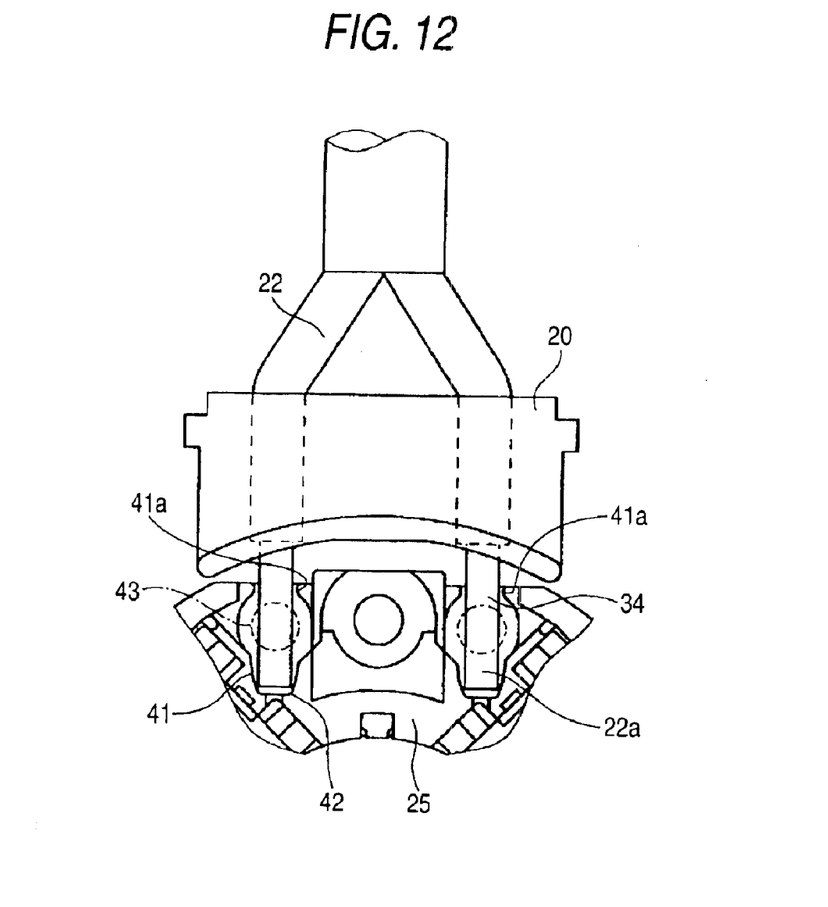
FIG. 12 is a detailed view near a lead wire lead-out portion according to the embodiment 2 of the invention.

FIGS. 11 and 12 show another embodiment of the positioning unit for the lead wire 22. Except for the positioning unit, the other constitution is the same as in the embodiment 1. FIG. 11 is a detailed view near the joint portion of the brush holder, and FIG. 12 is a detailed view near the lead wire lead-out portion. In FIG. 11, the guide portion 41a serving as the positioning unit, which is molded integrally with the base 25, is added to FIG. 8. The guide portions 41 and 41a for positioning the conductors 34 having the element wires 33 fixed beforehand are provided on both sides of the position of the electrode 43 in welding the top end portion 22a of the lead wire 22. The other constitution is the same as in the embodiment 1.

With this embodiment 2, there is the same effect as in the embodiment 1. However, in the embodiment 2, the guide portions 41 and 41a are provided on both sides of the electrode 43, whereby the positioning for welding is more reliably made and the welding position is more stabilized than in the embodiment 1.

Embodiment 3

Figure 13:
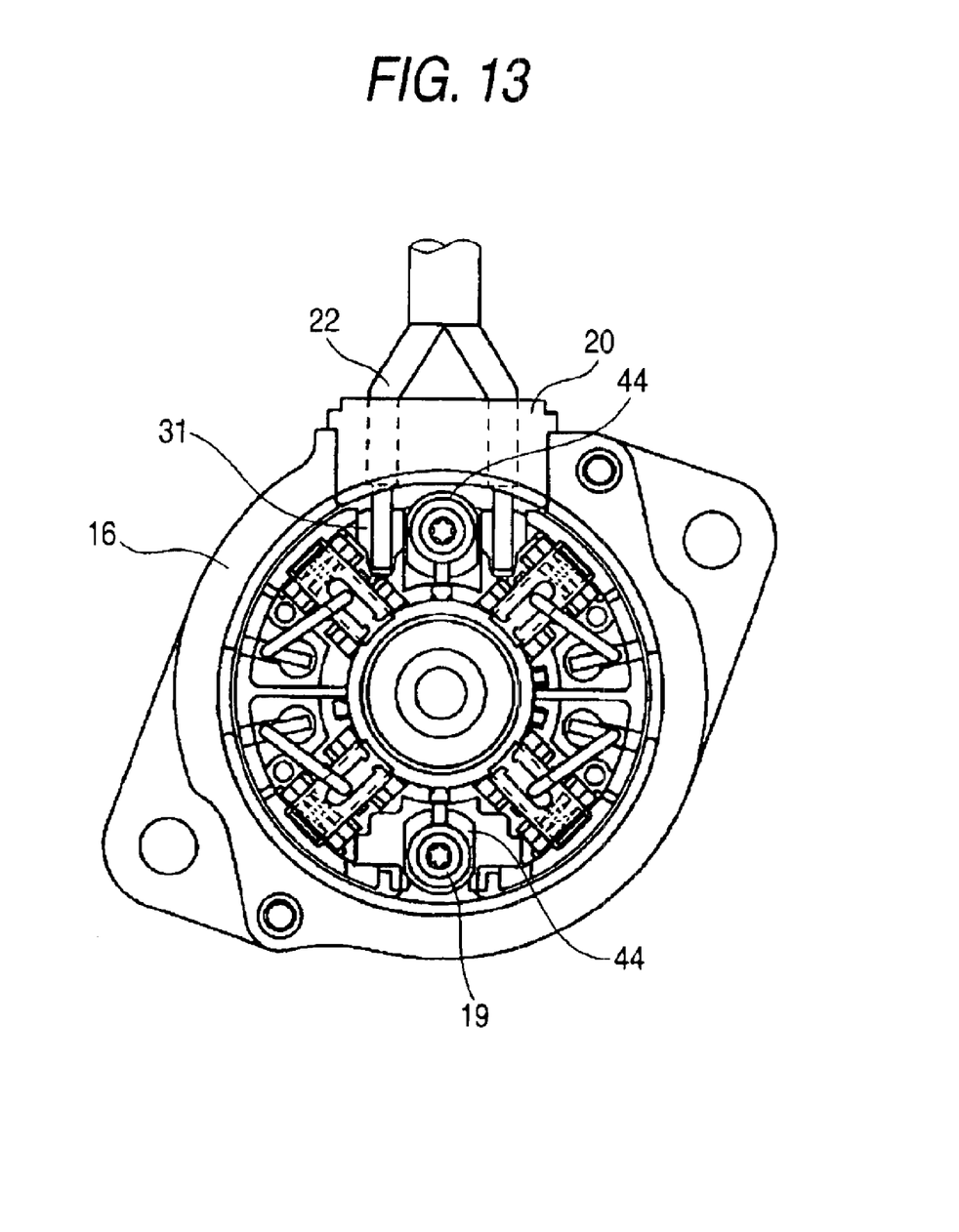
FIG. 13 is a front view near a housing and a brush holder device according to an embodiment 3 of the invention.
Figure 14:
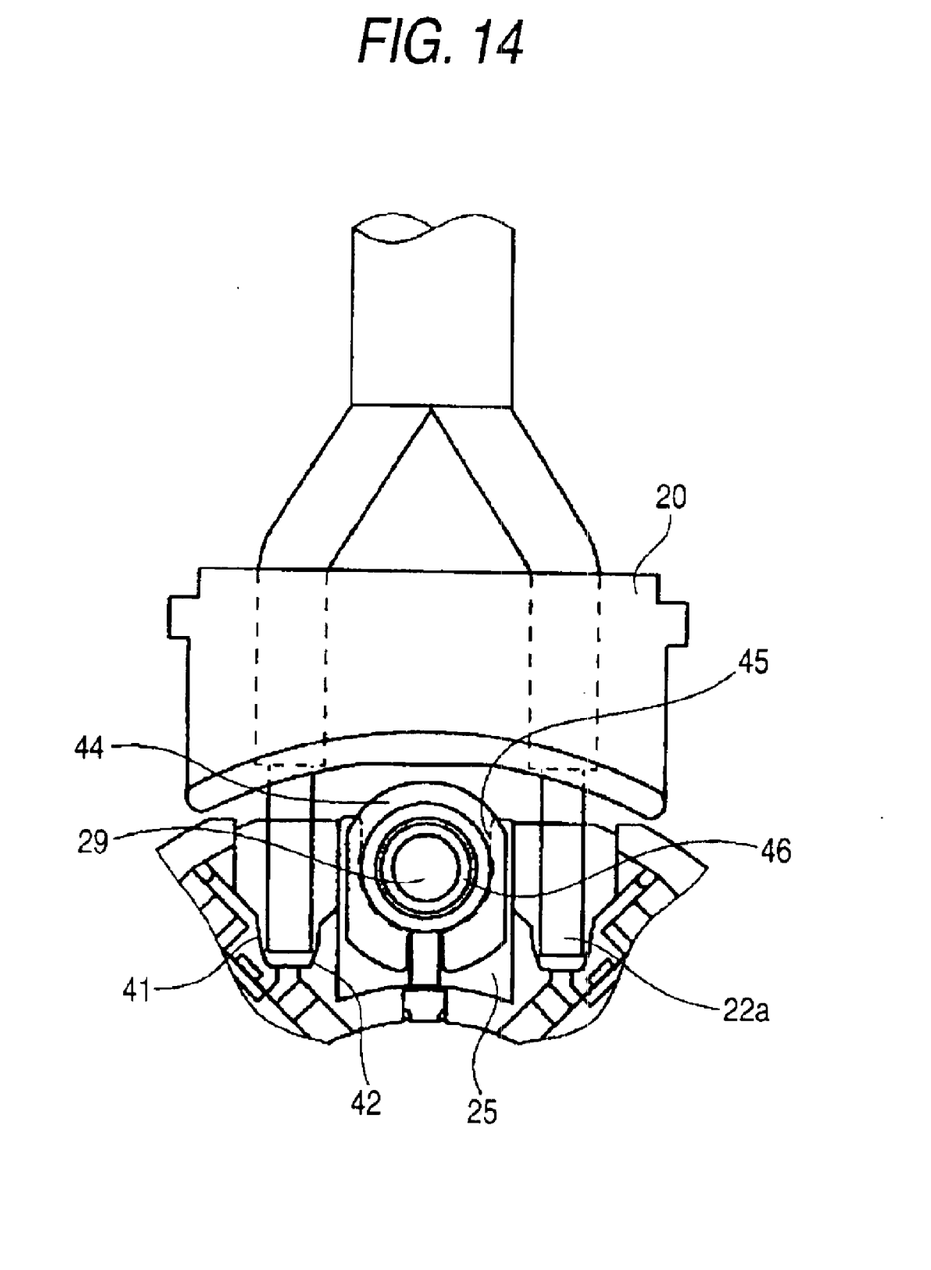
FIG. 14 is a detailed view near a lead wire lead-out portion according to the embodiment 3 of the invention.
Figure 15:
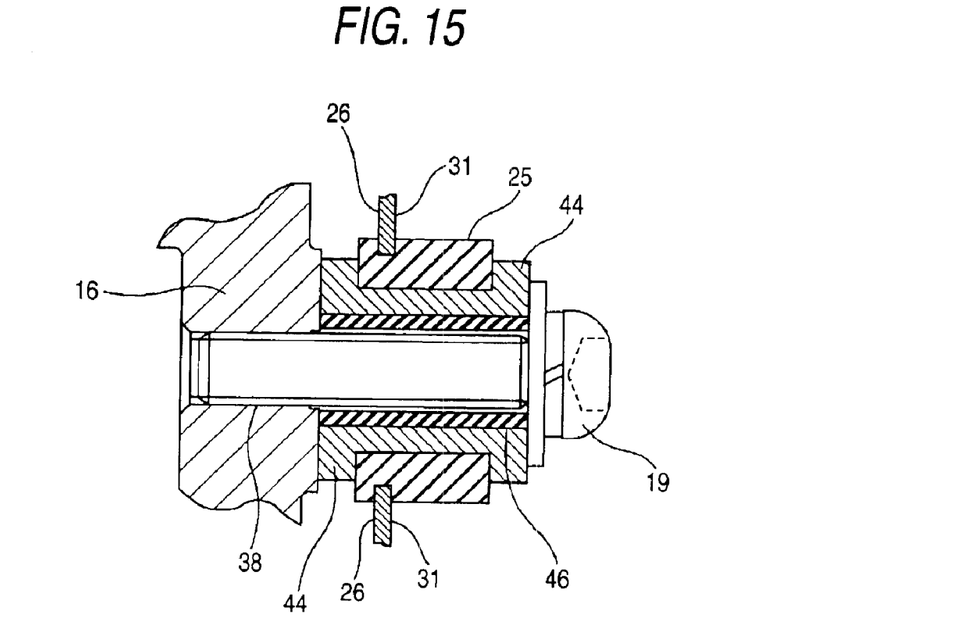
FIG. 15 is a cross-sectional view of the essence near a clamp screw according to the embodiment 3 of the invention.

FIGS. 13 to 15 show another embodiment. FIG. 13 is a front view of the housing and near the brush holder device. FIG. 14 is a detailed view near the lead wire lead-out portion. FIG. 15 is across-sectional view of the essence near the clamp screw. In these figures, the base 25 is fixed via an elastic body 44 made of rubber in the housing 16 by the clamp screw 19. The base 25 has a cutout portion 45 for disposing the elastic body 44, and a pipe-like bush 46 made of iron is provided on an inner face of the elastic body 44. The inner diameter side of the bush 46 constitutes the tapped hole with play 29, through which the clamp screw 19 is inserted with a play, so that the clamp screw 19 is tightened to the threaded portion 38 provided in the housing 16. In this manner, the base 25 is floated via the elastic body 44 not to directly contact the housing 16. In this embodiment, no projection 25a is provided on the outer circumferential face of the base 25. The positioning of the welding portion is performed in the same way as in the embodiment 1.

With the embodiment 3, the base 25 is floated via the elastic body 44, and when the welding position of the lead wire 22 is shifted, the elastic body 44 is elastically deformed, whereby there is a risk that the position of the base 25 is more likely to be biased. However, since the guide portion 41 serving as the positioning unit in welding the lead wire 22 is provided in the joint portion 31, the welding position is less shifted, and the base 25 is less biased and stabler, whereby the brush sound is more effectively reduced owing to floating.

Embodiment 4

Figure 16A:
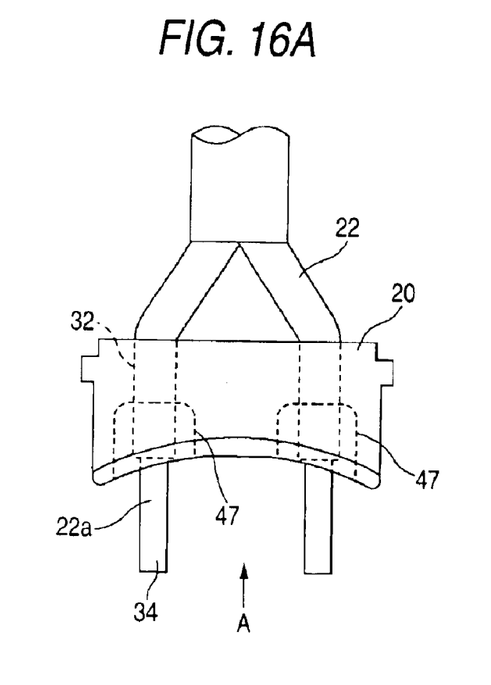
FIGS. 16A and 16B are a front view near a grommet and a bottom view of the grommet according to an embodiment 4 of the invention.
Figure 16B:
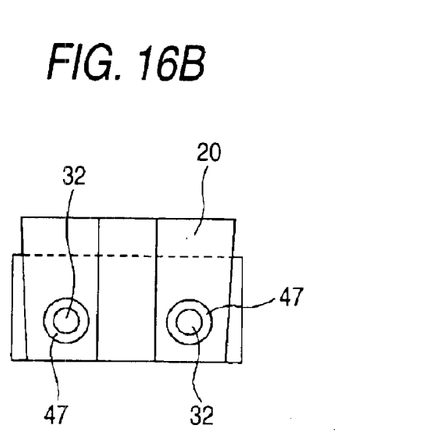

FIG. 16 shows another embodiment, in which FIG. 16A is a front view near the grommet and FIG. 16B is a bottom view of the grommet as seen from the arrow A. In the figures, the grommet 20 has a thinned portion 47 on the outer circumferential face of the lead wire 22 on the side of the joint portion 31 among the lead wires 22 penetrating through the grommet 20. The other constitution is the same as in other embodiments.

With the embodiment 4, since the thinned portion 47 is provided in the joint portion 31 of the grommet 20, the length of the lead wire 22 from an exit of the insertion hole 32 to the welding portion is consequently increased to make the lead wire 22 more flexible, so that the lead wire 22 is easily positioned, and the brush holder device 18 is improved in the assembling and water proofing. Since the lead wire 22 is more flexible, there is the greater effect if the lead wire 22 of large cross-sectional area is employed.

Though in the above embodiment, the grommet 20 has the insertion hole 32, through which the lead wire 22 is inserted, the lead wire 22 may be molded integrally with the grommet 20. Also, the rotating electric machine is not limited to the brush motor but may be a generator with brush.

As described above, with this invention, a rotating electric machine comprises a bowl-like housing having a through hole penetrated by a shaft and having a cutout portion in a part of an opening portion, a commutator fixed to the shaft, a base fixed to the housing by a clamp screw and having a tapped hole through which the clamp screw is inserted with a play, a brush disposed in the base and rubbing against the commutator, a plate having a joint portion to which a lead wire led outside is welded and fixed to the base, a grommet penetrated by the lead wire and engaged in the cutout portion of the housing, and a positioning unit for positioning the lead wire to be welded in the joint portion. Thereby, the rotating electric machine is produced cheaply in which the welding position of the lead wire is stable, the assembling of the apparatus is excellent, and the brush sound is reduced. Moreover, there are the effects that the water proofing of the grommet is improved, and the sputter is less produced in welding the lead wire.

What is claimed is:

1. A rotating electric machine, comprising:
   a bowl-like housing having a through hole penetrated by a shaft and having a cutout portion in a part of an opening portion;
   a commutator fixed to the shaft;
   a base fixed to the housing by a clamp screw and having a tapped hole through which the clamp screw is inserted with play;
   a brush disposed in the base and rubbing against the commutator;
   a plate having a joint portion to which a lead wire led from outside is welded and fixed to the base;
   a grommet penetrated by the lead wire and engaged in the cutout portion of the housing; and
   a positioning unit which positions the lead wire to be welded in the joint portion;
   wherein the position in a unit has a tapered face for leading the lead wire to a welding position.

2. The rotating electric machine according to claim 1, wherein the positioning unit is made of a resin material for forming the base and formed integrally with the base.

3. The rotating electric machine according to claim 1, wherein the lead wire has a conductor including a plurality of element wires; and
   top end portions of the plurality of element wires are welded to be fixed to the joint portion while a covering thereon is removed.

4. The rotating electric machine according to claim 1, wherein the lead wire includes a plurality of lead wires;
   the positioning unit includes a plurality of positioning units; and
   an interval between the lead wires penetrating through the grommet and an interval between the positioning units are equal.

5. The rotating electric machine according to claim 1, wherein the grommet has a thinned portion around the outer circumference of the lead wire penetrating through the grommet on the side of the joint portion.

6. The rotating electric machine according to claim 1, further comprising:
   an elastic body;
   wherein the base is fixed via the elastic body to the housing.

7. The rotating electric machine according to claim 1, wherein the plate is insert molded into the base by a resin material forming the base; and
   the joint portion being disposed inside an outer circumferential face of the base.

8. The rotating electric machine according to claim 1, wherein the rotating electric machine is a brush motor employed for an electric power steering apparatus.

9. The rotating electric machine according to claim 1, wherein the positioning unit is provided in the joint portion such that the positioning unit forms part of the joint portion.

* * * * *